US007254283B1

(12) United States Patent
Nishigaki et al.

(10) Patent No.: US 7,254,283 B1
(45) Date of Patent: Aug. 7, 2007

(54) IMAGE PROCESSOR PROCESSING IMAGE DATA IN PARALLEL WITH A PLURALITY OF PROCESSORS

(75) Inventors: Junji Nishigaki, Toyokawa (JP);
Atsushi Ishikawa, Okazaki (JP);
Kenichi Sawada, Toyohashi (JP);
Kazuhiro Ishiguro, Toyohashi (JP);
Hiroyuki Suzuki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/438,247

(22) Filed: Nov. 12, 1999

(30) Foreign Application Priority Data

Nov. 13, 1998 (JP) .................................. 10-323315

(51) Int. Cl.
*G06K 9/60* (2006.01)
(52) U.S. Cl. ...................... 382/304; 382/282; 382/284; 382/294; 358/540; 358/450
(58) Field of Classification Search ................ 382/282, 382/284, 287, 291, 293, 294, 295, 303, 304, 382/305, 164, 171, 177, 190, 277, 307; 345/629, 345/630, 634, 635, 532, 535, 536, 543; 348/584, 348/588; 358/448, 450, 452, 453, 540, 537, 358/538; 700/4, 5
See application file for complete search history.

(56) References Cited

U.S. PATENT DOCUMENTS

| 4,271,476 A | * | 6/1981 | Lotspiech .................... 382/235 |
| 4,606,066 A | * | 8/1986 | Hata et al. .................... 382/304 |
| 4,680,643 A | * | 7/1987 | Horiguchi .................... 358/409 |
| 4,734,782 A | * | 3/1988 | Maeshima ................... 358/466 |
| 4,894,646 A | * | 1/1990 | Ryman ........................ 345/556 |
| 5,007,005 A | * | 4/1991 | Hatakeyama et al. ........ 345/473 |
| 5,109,281 A | * | 4/1992 | Kobori et al. ............... 358/296 |
| 5,117,468 A | * | 5/1992 | Hino et al. ................... 382/284 |
| 5,129,074 A | * | 7/1992 | Kikuchi et al. .............. 711/173 |
| 5,142,616 A | * | 8/1992 | Kellas et al. ................ 345/634 |
| 5,146,592 A | * | 9/1992 | Pfeiffer et al. ............... 345/807 |
| 5,263,003 A | * | 11/1993 | Cowles et al. .......... 365/230.03 |
| 5,436,735 A | * | 7/1995 | Tanabe et al. ............... 358/453 |
| 5,448,655 A | * | 9/1995 | Yamaguchi ................... 382/304 |
| 5,621,503 A | * | 4/1997 | Komaki et al. .............. 399/366 |
| 5,646,679 A | * | 7/1997 | Yano et al. .................... 348/47 |
| 5,692,210 A | * | 11/1997 | Mita et al. ................... 345/502 |
| 5,715,436 A | * | 2/1998 | Kawai et al. ................ 395/505 |
| 5,717,946 A | * | 2/1998 | Satou et al. ................. 712/225 |
| 5,758,043 A | * | 5/1998 | Takizawa et al. ........... 395/115 |
| 5,887,079 A | * | 3/1999 | Endo et al. .................. 382/169 |
| 5,892,852 A | * | 4/1999 | Namizuka et al. .......... 382/254 |
| 5,920,646 A | * | 7/1999 | Kamon ........................ 382/173 |

(Continued)

FOREIGN PATENT DOCUMENTS

JP             03-177961         8/1991

*Primary Examiner*—Yosef Kassa
(74) *Attorney, Agent, or Firm*—Sidley Austin LLP

(57) ABSTRACT

In order to efficiently process image data in a circuit dividing single image data into a plurality of data and processing the data with a plurality of MPUs in parallel with each other, the MPUs process image data input through an input image data in parallel with each other. An address bus inputs addresses of the image data, and address memories provided on the MPUs store the addresses of the image data processed by the MPUs respectively. When the image data are completely processed, the image data are output through an output image bus while the addresses of the image data are output through the address bus.

15 Claims, 21 Drawing Sheets

U.S. PATENT DOCUMENTS

| | | | |
|---|---|---|---|
| 5,920,674 A * | 7/1999 | Okita et al. | 386/52 |
| 6,145,060 A * | 11/2000 | Takasu et al. | 711/154 |
| 6,161,208 A * | 12/2000 | Dutton et al. | 714/764 |
| 6,185,629 B1 * | 2/2001 | Simpson et al. | 710/10 |
| 6,188,440 B1 * | 2/2001 | Toujima et al. | 348/554 |
| 6,188,693 B1 * | 2/2001 | Murakami | 370/395.62 |
| 6,191,810 B1 * | 2/2001 | Oosaka et al. | 348/96 |
| 6,233,361 B1 * | 5/2001 | Downs | 382/260 |
| 6,259,459 B1 * | 7/2001 | Middleton | 345/536 |
| 6,263,118 B1 * | 7/2001 | Kanno et al. | 382/289 |
| 6,330,373 B1 * | 12/2001 | McKinney et al. | 382/279 |
| 6,340,973 B1 * | 1/2002 | Ochiai et al. | 345/534 |
| 6,356,314 B1 * | 3/2002 | Takebe | 348/564 |
| 6,393,162 B1 * | 5/2002 | Higurashi | 382/284 |
| 6,590,724 B2 * | 7/2003 | Togino | 359/833 |
| 6,919,892 B1 * | 7/2005 | Cheiky et al. | 345/473 |
| 6,922,262 B2 * | 7/2005 | Takano et al. | 358/3.2 |

* cited by examiner

EXEMPLARY STATUS REGISTER

|  | STANDBY | INPUT | PROCESSING | END OF PROCESSING | OUTPUT |
|---|---|---|---|---|---|
| MPU1 | 0 | 1 | 0 | 0 | 0 |
| MPU2 | 1 | 0 | 0 | 0 | 0 |
| MPU3 | 0 | 0 | 1 | 0 | 0 |
| MPU4 | 0 | 0 | 0 | 0 | 1 |

FLOW OF PROCESSING OF DATA FLOW CONTROL PART

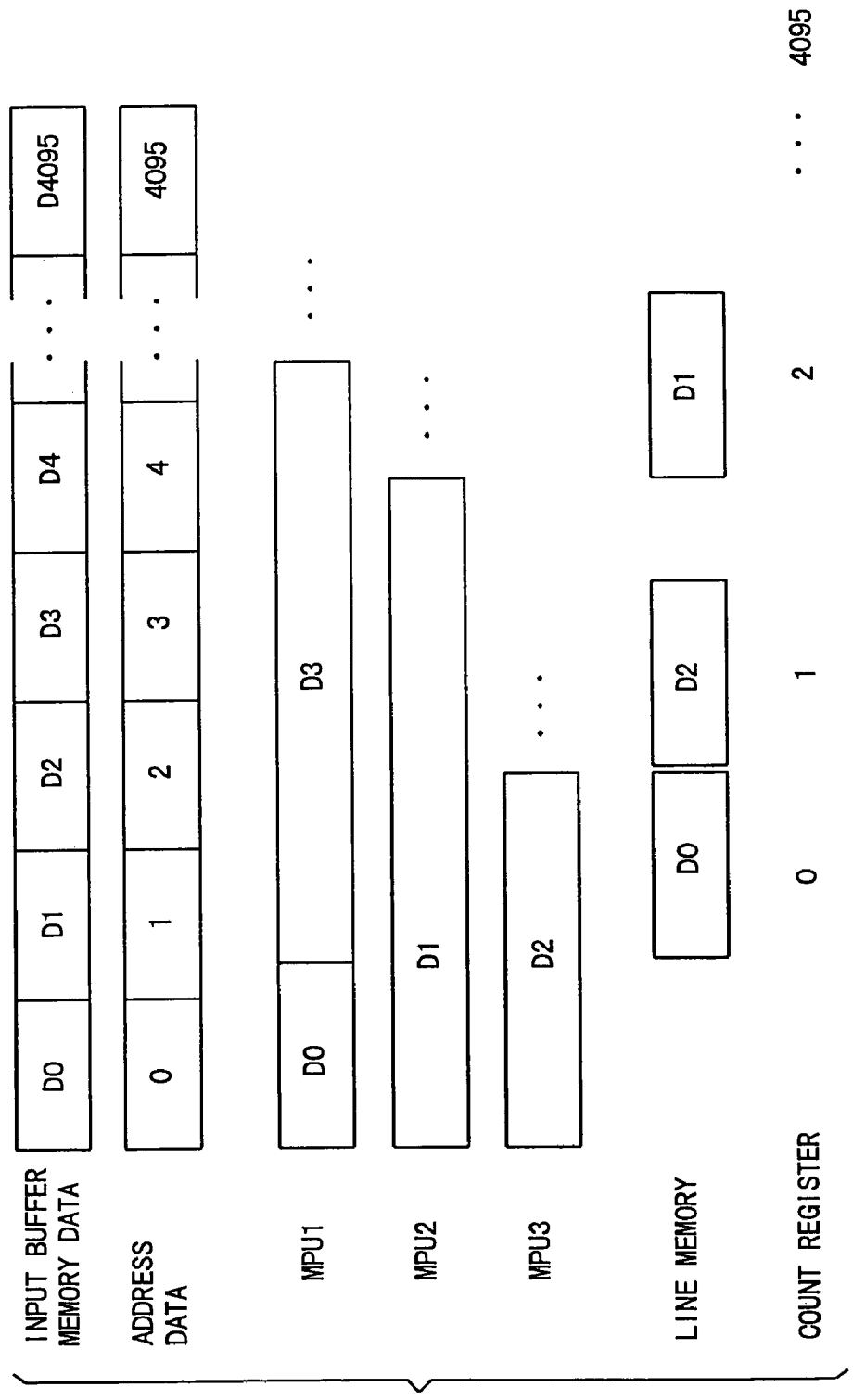
F I G. 15

F I G. 1 7
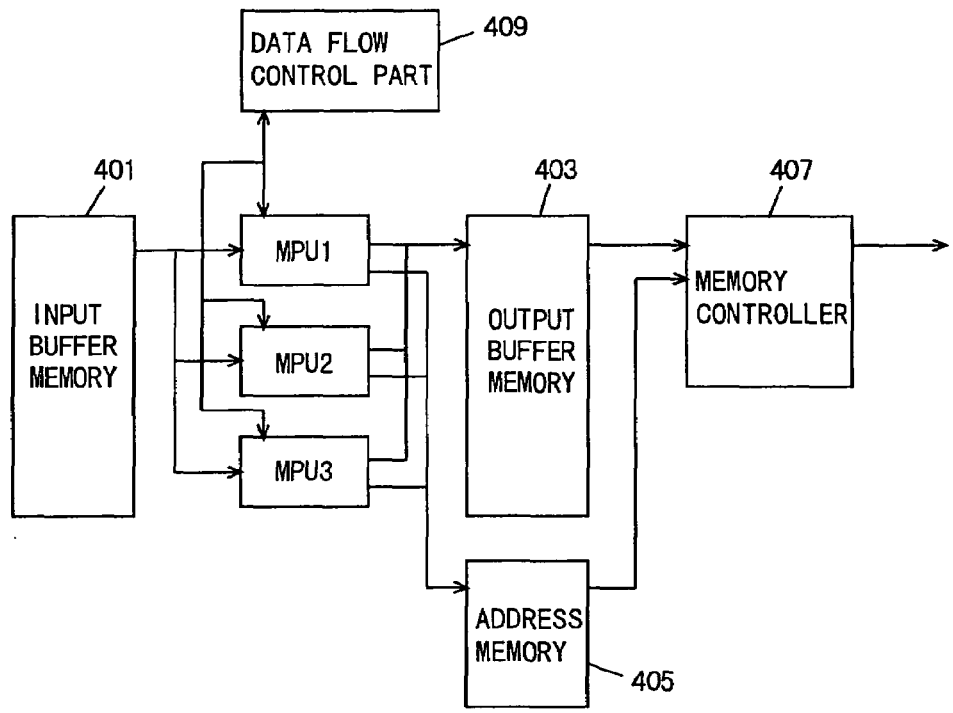
F I G. 1 8
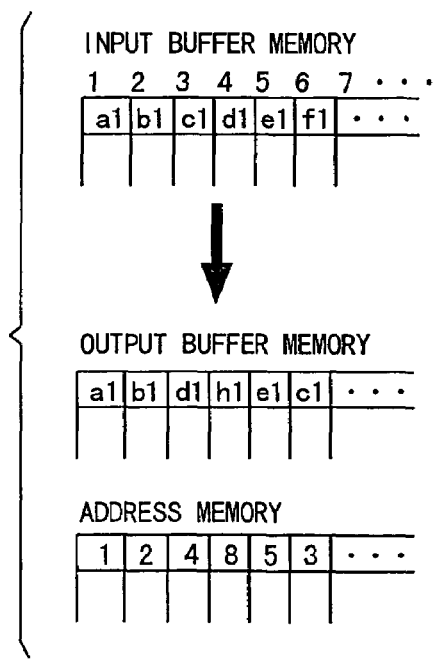

IMAGE PROCESSOR PROCESSING IMAGE DATA IN PARALLEL WITH A PLURALITY OF PROCESSORS

This application is based on Application No. 10-323315 filed in Japan, the content of which is hereby incorporated by reference.

BACKGROUND OF THE INVENTION

1. Field of the Invention

The present invention relates to an image processor, and more particularly, it relates to an image processor comprising a plurality of processors processing input image data in parallel and outputting the processed image data.

2. Description of the Related Art

FIGS. 23A and 23B are block diagrams showing the structure of an image processor provided on a conventional digital copying machine. Referring to FIG. 23A, the image processor is formed by a CCD 901, an A-D conversion part 903, a shading correction and LOG conversion part 905, a variable power part 907, an MTF correction part 909, a γ correction part 911 and a binarization processing part 913.

The A-D conversion part 903 converts image data subjected to optical/electrical conversion by the CCD 901 to digital data. Thereafter the image data is sequentially subjected to image processing and then output to a printer or the like. The blocks 905 to 913 for the image processing perform synchronous pipeline processing to operate with the same clock.

FIG. 23B is a block diagram showing the structure of an image processor performing image processing with an MPU 917. This image processor employs the MPU 917 in place of the image processing blocks 905 to 913 shown in FIG. 23A. Such a device is capable of rewriting an image processing program at any time and hence has a high degree of freedom, although the same is inferior to the device employing synchronous pipeline processing in consideration of the operating speed. The processing time for each pixel varies with the load of processing due to asynchronous processing with the MPU 917. Therefore, this device requires an input memory 915 and an output memory 919 for the MPU 917, for the purpose of synchronization with an input unit and an output unit.

Japanese Patent Laying-Open No. 3-177961 (1991) discloses a multiprocessor control unit, which processes image data for one frame in block units with a plurality of MPUs of a parallel structure.

FIG. 24 is a block diagram showing the structure of such a multiprocessor control unit. The multiprocessor control unit is formed by a data flow control part 952, a feedback frame memory 951, a status register 953, MPU1 to MPU4, a feedback bus, an output image bus and an input image bus.

The data flow control part 952 monitors values of the status register 953 storing processing states of the MPU1 to MPU4 and busy conditions of the buses. The data flow control part 952 instructs each MPU to operate. In other words, the data flow control part 952 allocates a new block of image data to an MPU terminating processing. A free MPU sequentially processes image data sequentially input in a serial manner, so that the image data are output at random regardless of the input sequence.

When requiring a result of processing of a preceding frame, each MPU captures feedback data of a required area from the feedback frame memory 951 through the feedback bus.

In the device shown in FIG. 24 processing and outputting subsequent input data from the MPU terminating processing through the data flow control part 952, the MPU has no idling standby time. In this device outputting image data regardless of the sequence of input data, however, the output data must be rearranged.

In order to eliminate the necessity for such rearrangement of the output data, the data output timings of the MPUs may be adjusted. Such a method is now described.

FIG. 25 shows a state of image data of one frame divided into 4 by 6 (=24) blocks. In this case, the MPU1 to MPU4 process the blocks of columns L1 to L4 respectively. Referring to FIG. 26, data of blocks D00, D01, D02 and D03 are input in the multiprocessor control unit at a time T1, so that the MPU1 to MPU4 process the data of the blocks D00 to D03 respectively. At a time t2 when the MPU (MPU3 in FIG. 26) having the lowest processing speed terminates the processing, processed data Q00 to Q03 are sequentially output. At the same time, data of new blocks D11 to D13 are input at the time t2 and processed by the MPU1 to MPU4 respectively.

Thus, the data can be output along the sequence of the blocks due to such processing, to require no rearrangement.

In the method shown in FIG. 26, however, the MPUs have idling standby times although no rearrangement of the output data is necessary. Thus, the image processing cannot be performed at a high speed.

SUMMARY OF THE INVENTION

Accordingly, an object of the present invention is to provide an image processor capable of performing image processing at a high speed and readily rearranging output data.

In order to attain the aforementioned object, an image processor according to an aspect of the present invention comprises a plurality of processors processing input image data in parallel and outputting the processed image data and an address memory storing address information of the image data processed by each of the plurality of processors.

Preferably, the image processor further comprises an image memory storing the image data output from the plurality of processors and a read unit reading the image data from the image memory on the basis of the address information stored in the address memory.

Preferably, the image processor further comprises an image memory storing the image data output from the plurality of processors along the sequence of addresses on the basis of the address information stored in the address memory.

More preferably, the image processor further comprises an input unit inputting image data subjected to processing in synchronization with a first external device and an output unit outputting the image data processed in the plurality of processors and the address information stored in the address memory in synchronization with a second external device.

According to the present invention, the address information of the image data processed by each of the plurality of processor is so stored that an image processor capable of performing image processing at a high speed and readily rearranging output data can be provided.

Preferably, the plurality of processors also output arrangement information corresponding to the data when outputting the processed data.

According to another aspect of the present invention, an image processor comprises a plurality of processors performing prescribed processing on a plurality of data divided from single image data, a first memory storing arrangement information in the original image data for the divided plurality of data, and a controller restoring a single image from the plurality of data processed in the plurality of processors in accordance with the arrangement information.

Preferably, the image processor further includes a second memory storing the data processed in the plurality of processors, and the controller reads the data from the second memory in sequence along the arrangement information and restores the image.

Preferably, the image processor further includes an image memory, and the controller stores the processed data in positions of the image memory corresponding to the arrangement information.

Preferably, the memory is provided in correspondence to each of the plurality of processors.

Preferably, the plurality of processors also output the arrangement information corresponding to the data when outputting the processed data.

According to still another aspect of the present invention, an image processing method includes steps of dividing input image data into a plurality of image data, performing image processing on the divided image data with a plurality of processors, outputting the processed data as well as address information indicating arrangement of the divided data, and restoring a single image from the processed data in accordance with the address information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 illustrates effects of the third embodiment;

FIG. 17 is a block diagram showing the structure of an image processor of a fourth embodiment according to the present invention;

FIG. 18 illustrates effects of the fourth embodiment;

DESCRIPTION OF THE PREFERRED EMBODIMENTS

First Embodiment

Figure 1:
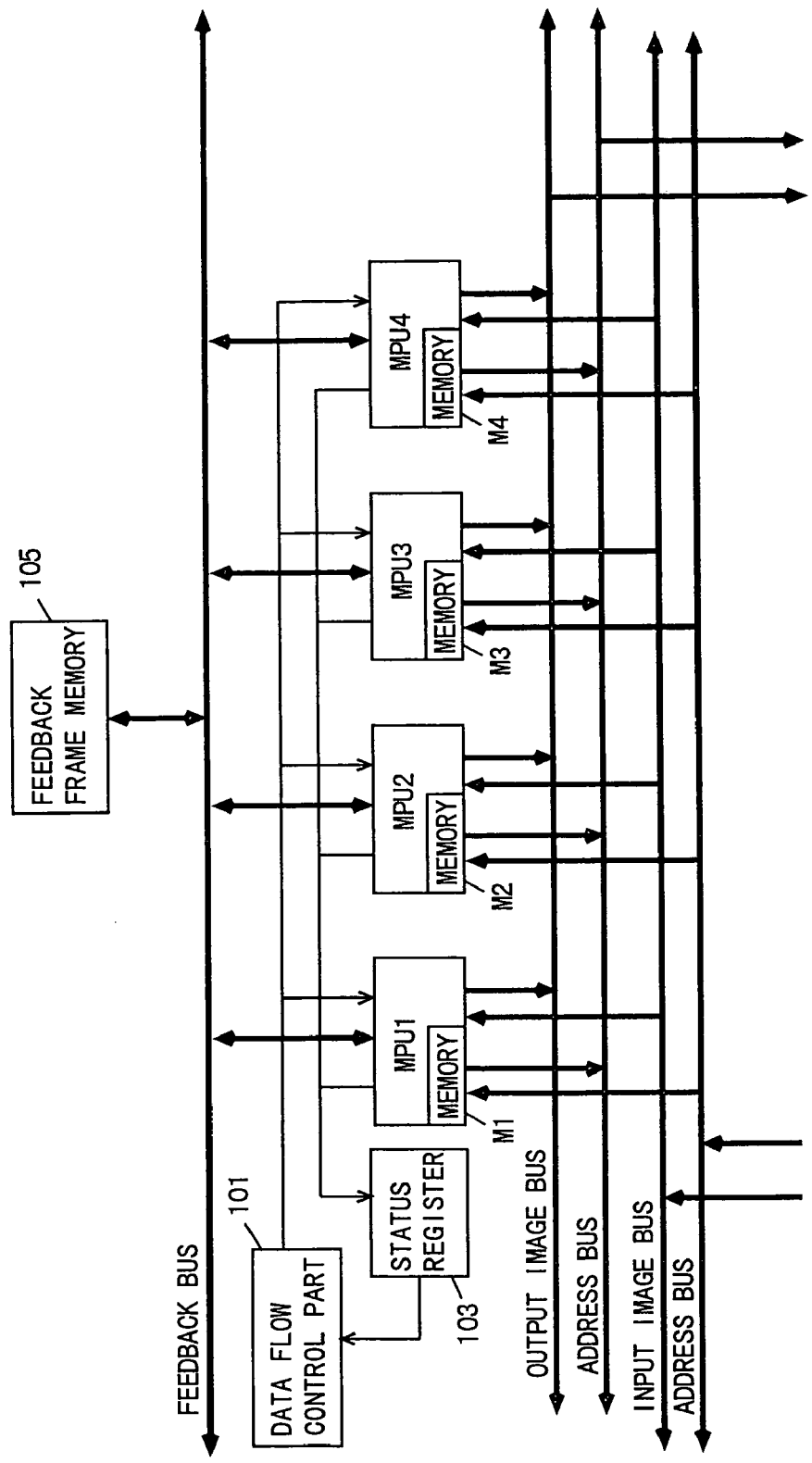
FIG. 1 is a block diagram showing the structure of an image processor of a first embodiment according to the present invention.

Referring to FIG. 1, an image processor of a first embodiment according to the present invention is formed by a data flow control part 101, a status register 103, a feedback frame memory 105, MPU1 to MPU4, a feedback bus, an output image bus, an address bus outputting addresses of output image data, an input image bus, and an address bus inputting addresses of input image data.

The image data of a single image subjected to processing is divided into a plurality of image data, which in turn are processed by the MPU1 to MPU4 in parallel with each other. Memories (address memories) M1 to M4 storing address information (address data) of the image data processed by the MPU1 to MPU4 are provided for the MPU1 to MPU4 respectively.

When the image data processed by the MPU1 to MPU4 are output, the address data are also output. Thus, processing for restoring a single image from the output image data is simplified.

A single image is divided into a plurality of image data which are processed in parallel with each other, and hence the address data are provided for restoring the original image from the divided image data after the processing. The address data are information indicating the sequence and arrangement of the image data, and sequentially supplied to the divided image data. The original image can be restored from the divided image data by arranging the image data along the sequence of the addresses.

Figures 23A, 23B:
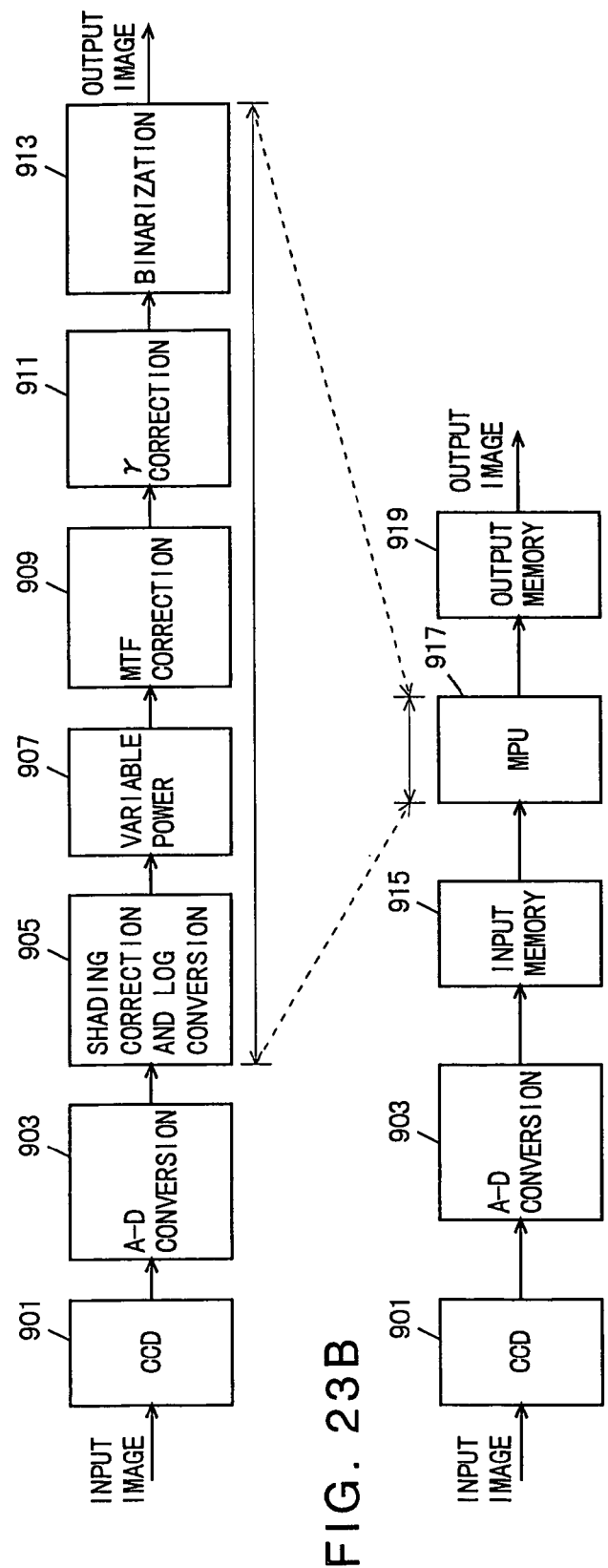
FIGS. 23A and 23B are block diagrams showing the structures of conventional image processors.
Figure 24:
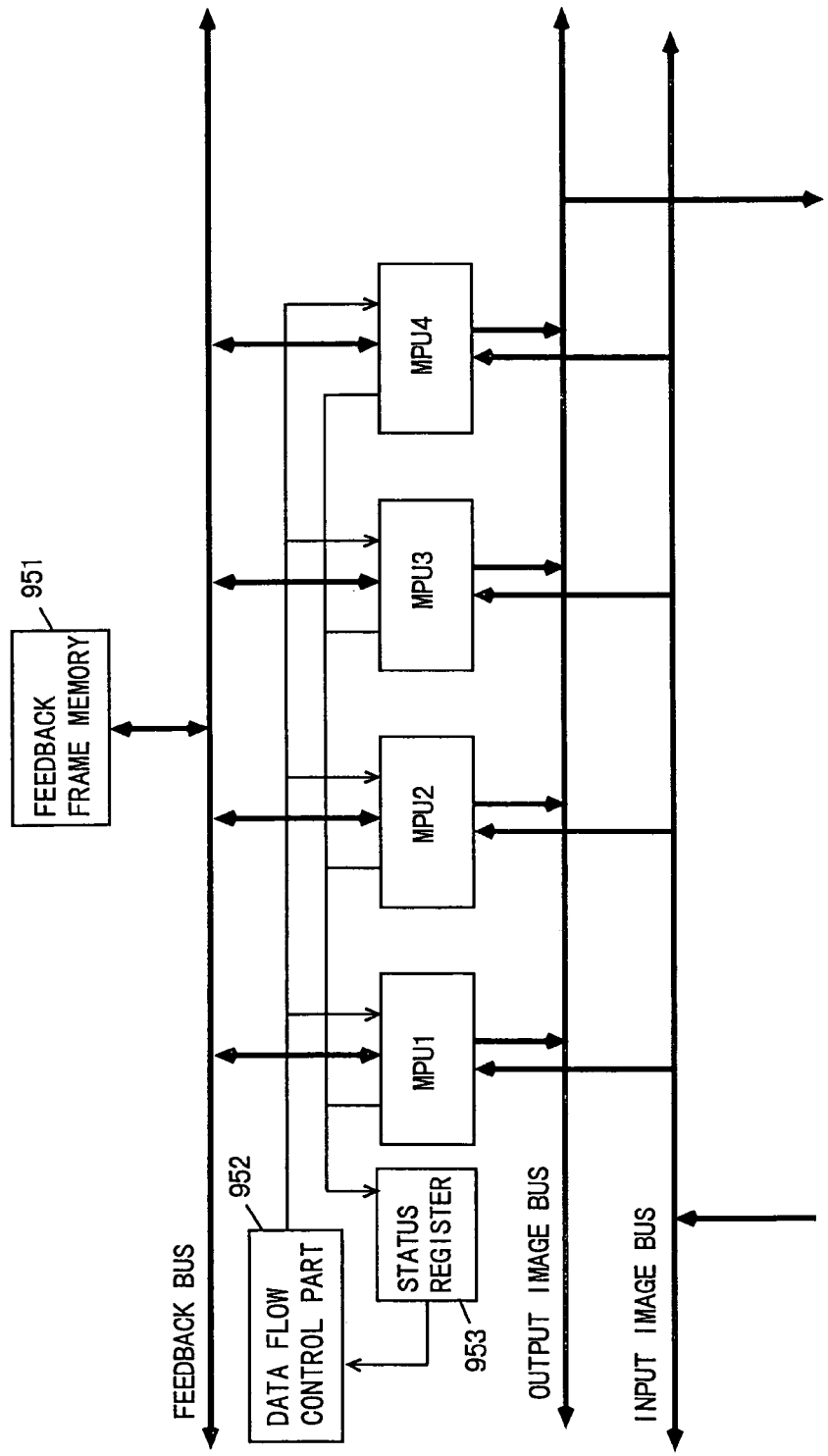
FIG. 24 is a block diagram showing the structure of an image processor having a plurality of MPUs arranged in parallel with each other.

The output memory 919 shown in FIG. 23B may be provided on the rear stage of the device for writing corresponding processed image data in addresses of the output memory 919 corresponding to the address data stored in the memories M1 to M4. Thus, a single processed image can be obtained.

Figures 2, 3:
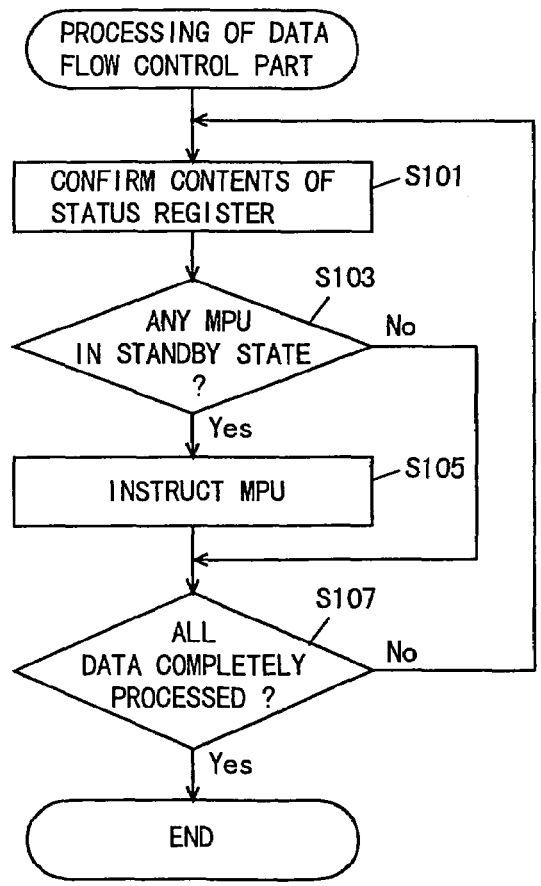
FIG. 2 illustrates the structure of a status register.
FIG. 3 is a flowchart showing processing of a data flow control part.

FIG. 2 illustrates a specific example of the status register 103. The status register 103 stores the states of the MPU1 to MPU4. Each MPU has five states, i.e., "standby", "input", "processing", "end of processing" and "output" states.

The MPU performs no processing in the "standby" state, and receives image data from the input image bus in the "input" state. The MPU processes the input image data in the "processing" state, and terminates processing the image data in the "end of processing" state. The MPU outputs the image data through the output image bus in the "output" state.

The status register 103 indicates the current state of each MPU with FIG. 3 is a flowchart showing processing of the data flow control part 101. Referring to FIG. 3, the data flow control part 101 confirms the contents (see FIG. 2) of the status register 103 at a step S101. The data flow control part 101 determines whether or not any MPU is in the "standby" state at a step S103. If the determination is of YES, the data flow control part 101 instructs the MPU to receive and process image data at a step S105. The data flow control part 101 determines whether or not processing of all image data is terminated at a step S107, and ends this routine if the determination is of YES.

If the determination at the step S103 is of NO, the process advances to the step S107. If the determination at the step S107 is of NO, the process returns to the step S101.

Figure 4:
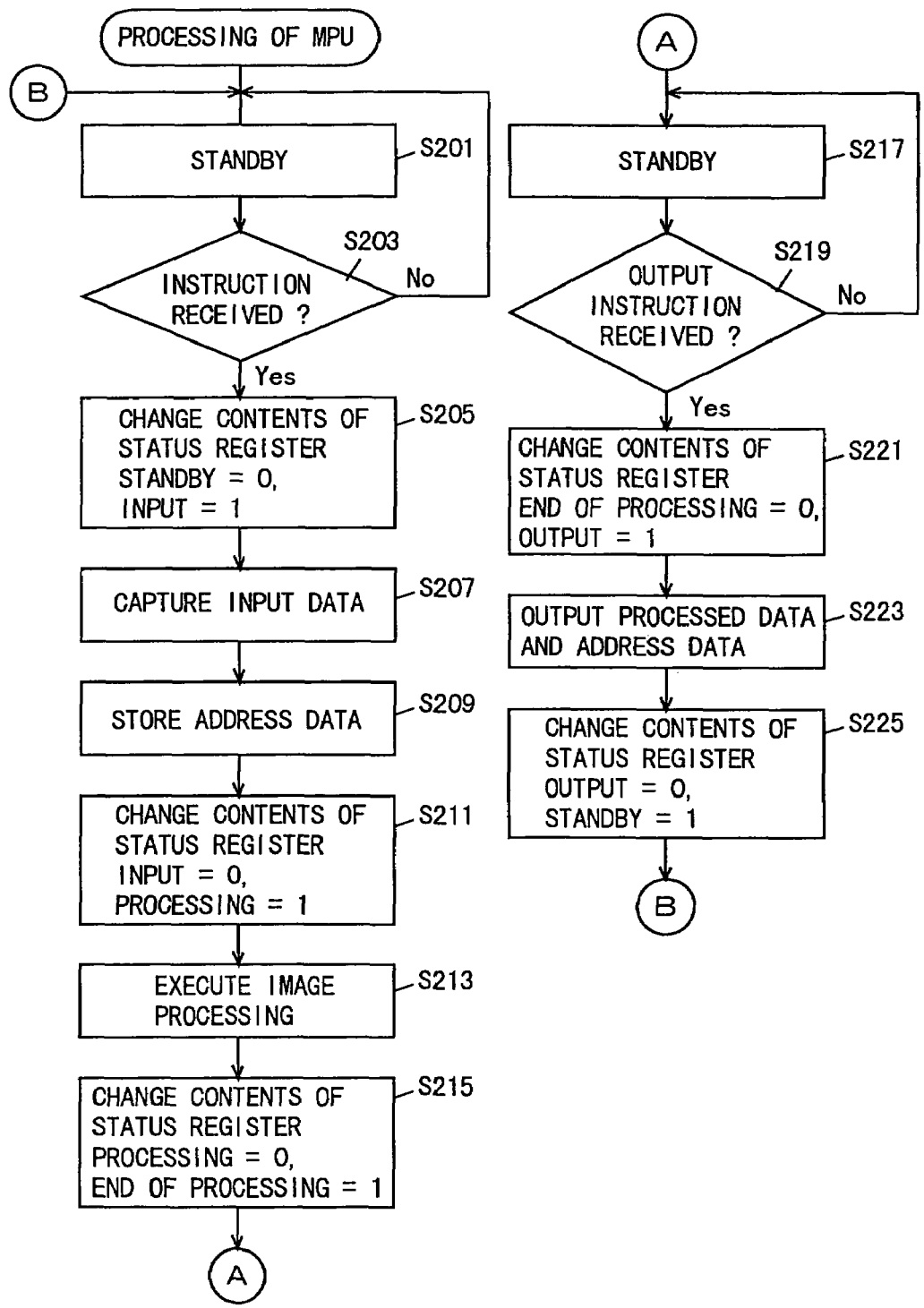
FIG. 4 is a flowchart showing processing of a single MPU.

FIG. 4 is a flowchart showing processing of one of the MPU1 to MPU4. Referring to FIG. 4, the MPU enters the "standby" state at a step S201. This state is recorded in the status register 103.

A determination is made at a step S203 as to whether or not an instruction is received from the data flow control part 101, and the processing from the step S201 is repeated until the determination is of YES. If the determination at the step S203 is of YES, the state of the MPU in the status register 103 is changed at a step S205. More specifically, "0" is written in the column of "standby" and "1" is written in the column of "input".

At a step S207, the MPU inputs image data subjected to processing by the MPU through the input image bus. At a step S209, the MPU stores the address of the image data processed by the MPU in the corresponding one of the memories M1 to M4.

At a step S211, "0" is set in the column of "input" in the status register 103 while "1" is set in the column of "processing". The input image is processed at a step S213. If the processing is terminated, "0" is set in the column of "processing" and "1" is set in the column of "end of processing" in the status register 103 at a step S215.

The MPU enters a standby state at a step S217, to wait for an output instruction from the data flow control part 101 at a step S219. When receiving the output instruction, "0" is set in the column of "end of processing" and "1" is set in the column of "output" in the status register 103 at a step S221. At a step S223, the image data processed by the MPU is output through the output image bus, along with the address data stored by the corresponding one of the memories M1 to M4 through the address bus. At a step S225, "0" is set in the column of "output" and "1" is set in the column of "standby" in the status register 103. Thereafter the process returns to the step S201.

Figure 5:
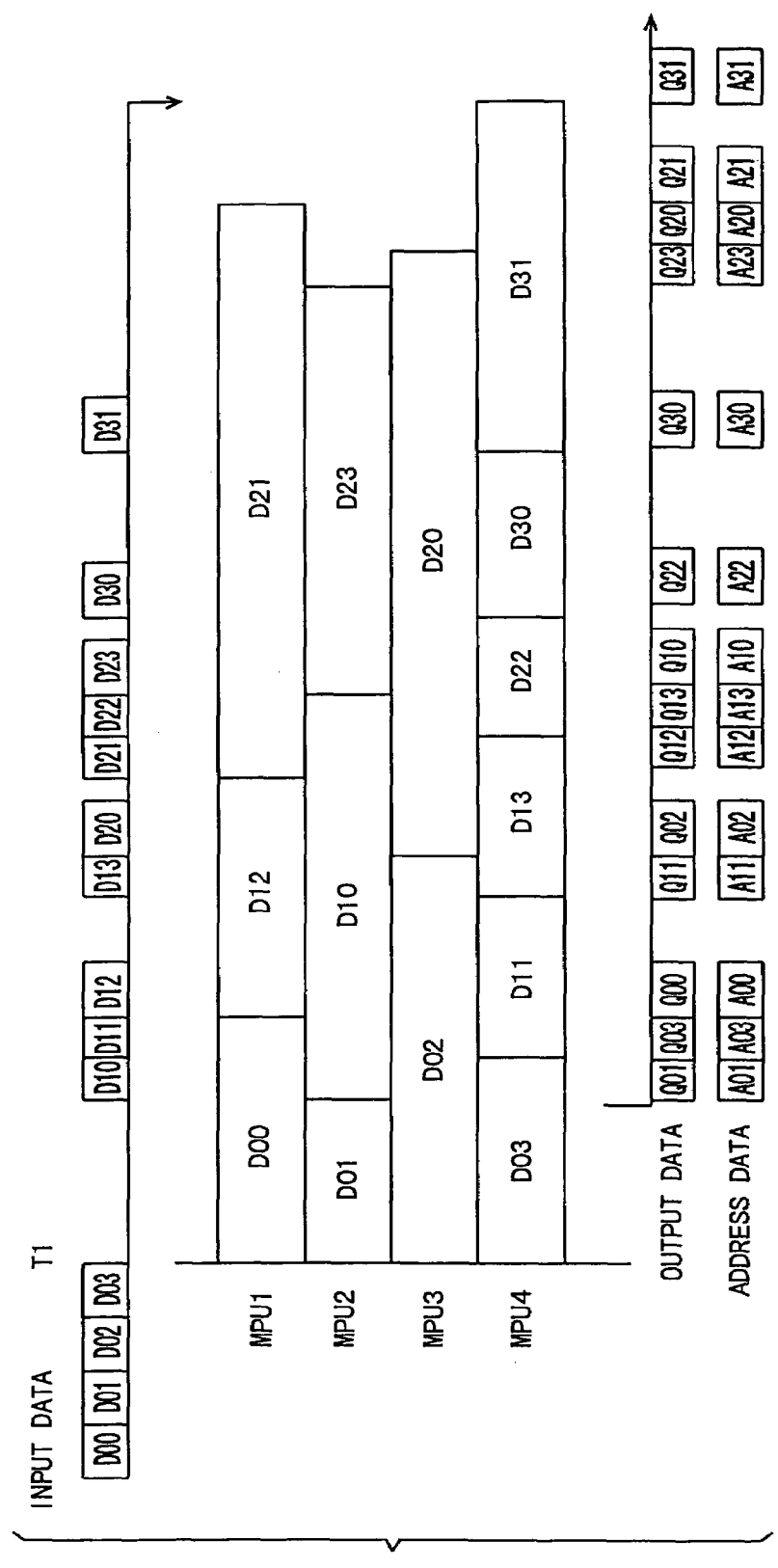
FIG. 5 illustrates effects of the first embodiment.
Figure 26:
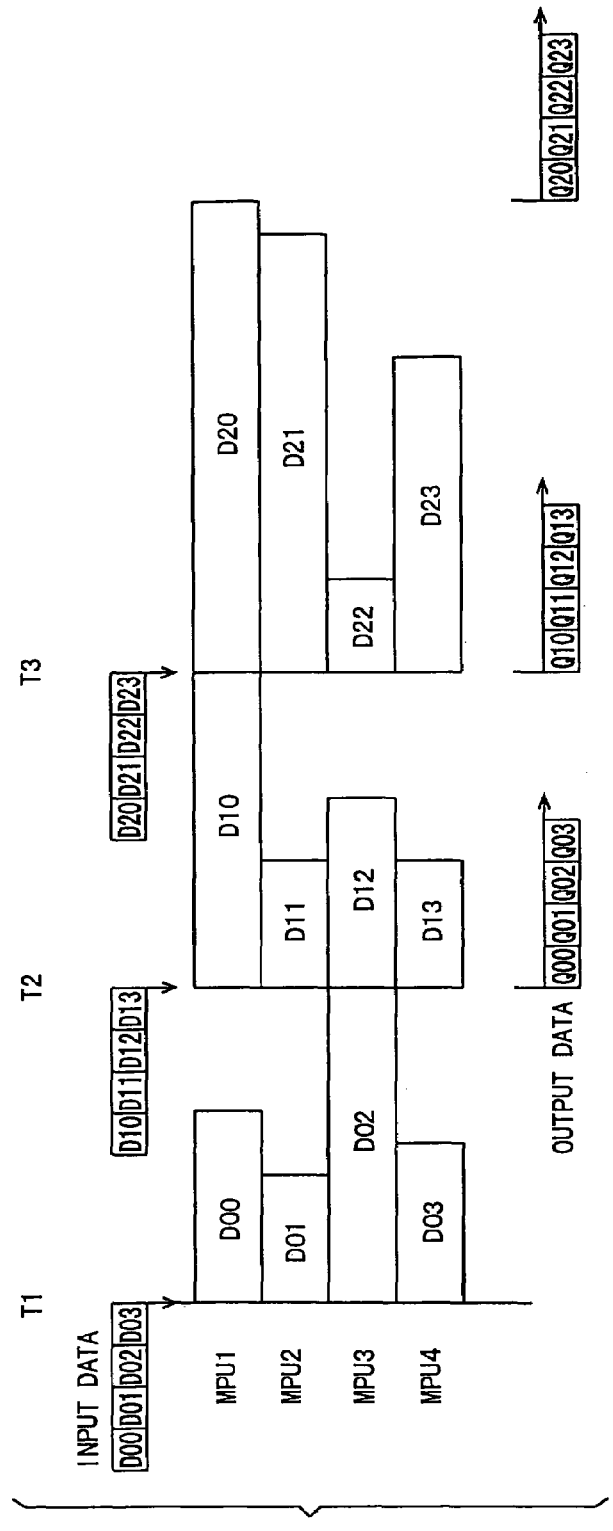
FIG. 26 illustrates problems of the prior art.

FIG. 5 is a timing chart showing the relation between the input data, the processing of the MPU1 to MPU4, the output data and the address data. Referring to FIG. 5, the image data D00 to D03 are input in the MPU1 to MPU4 respectively at a time T1 for starting image processing. The MPU2 terminating the processing first outputs the image data Q01 as an output result of the image data Q01. At this time, address data A01 for the image data Q01 is also output. Thereafter the image data D1 subjected to subsequent processing is input in the MPU2, which in turn starts processing the image data D10. Then, an MPU subsequently completing processing outputs data so that new image data is input in this MPU. Such processing is so repeated that the standby times of the MPU1 to MPU4 can be reduced as compared with the prior art shown in FIG. 26, and the image processing can be performed at a higher speed. While the sequence of the output data is different from that of the input data, the output data, which are output along with the address data, can be efficiently rearranged through the address data.

When requiring the result of processing of a preceding frame, each MPU captures feedback data of a required area from the feedback memory 105 through the feedback bus. According to this embodiment, only a single feedback memory 105 is provided on the device to be shared by the MPU1 to MPU4, and hence the burden of processing is reduced as compared with the case of providing such feedback memories for the MPU1 to MPU4 respectively.

Second Embodiment

Figure 6:
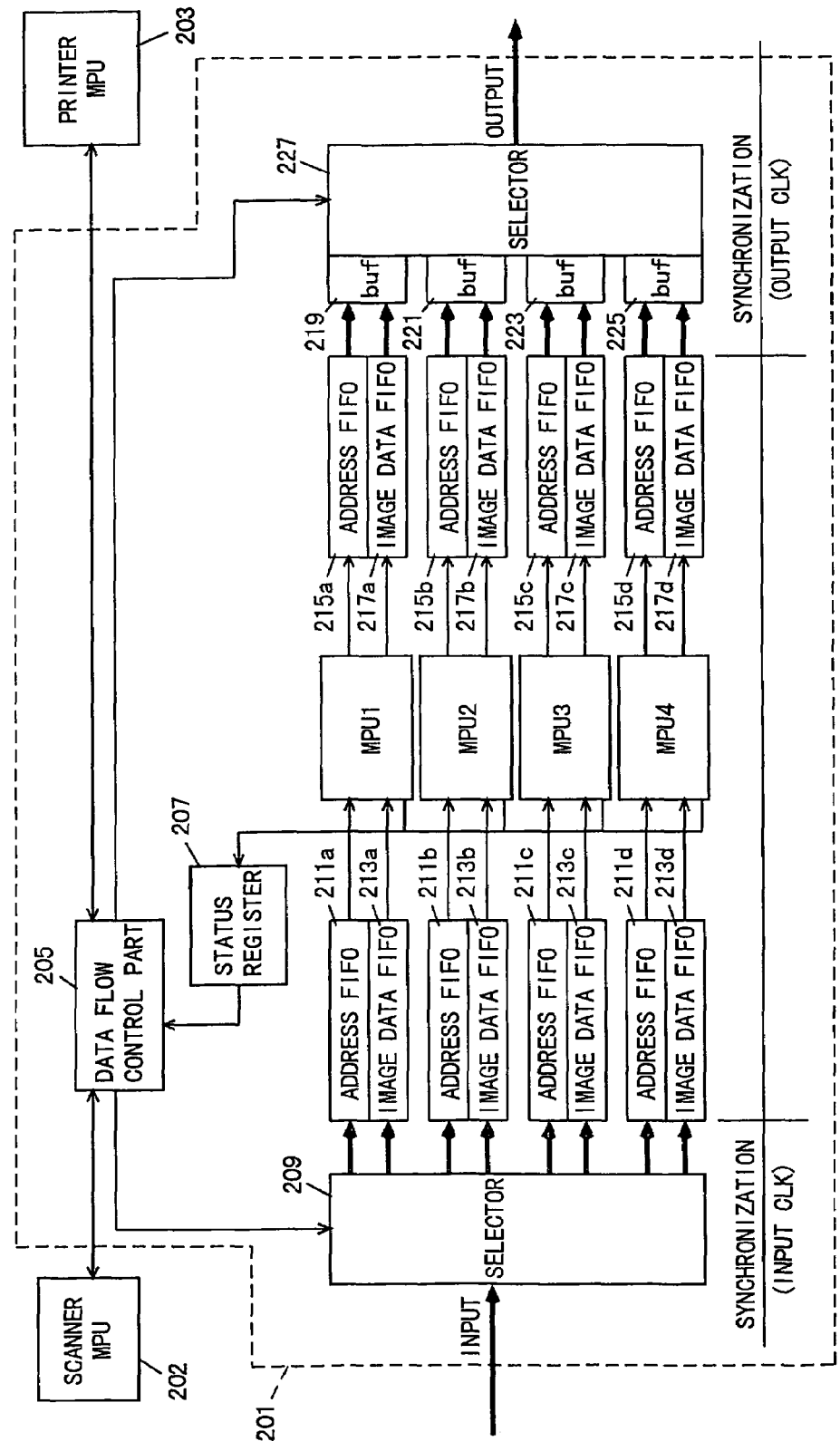
FIG. 6 is a block diagram showing the structure of an image processor of a second embodiment according to the present invention.

FIG. 6 is a block diagram showing the structure of an image processor 201 of a second embodiment according to the present invention. This image processor 201 is connected between a scanner (image reader) and a printer, for processing data while communicating with an MPU 202 of the scanner and an MPU 203 of the printer.

The image processor 201 is formed by a data flow control part 205, a status register 207, a selector 209, address FIFO memories 211a to 211d, image data FIFO memories 213a to 213d, MPU1 to MPU4, address FIFO memories 215a to 215d, image data FIFO memories 217a to 217d, buffer memories 219 to 225 and a selector 227.

The selector 209 inputs image data subjected to processing in synchronization with the scanner serving as an external device. The selector 227 outputs the processed image data and address information in synchronization with the printer serving as an external device.

The status register 207 stores the states of the MPU1 to MPU4, as described with reference to FIG. 2.

The image processor 201 according to this embodiment is provided with the FIFO memories 213a to 213d and 217a to 217d for the image data and the FIFO memories 211a to 211d and 215a to 215d for the address data in correspondence to synchronous input and output.

The data flow control part 205 having a counter checks the quantities of input and output data while making communication with the scanner MPU 202 and the printer MPU 203. The data flow control part 205 interrupts data input when the FIFO memories 211a to 211d and 213a to 213d are full, while interrupting data output when the FIFO memories 215a to 215d and 217a to 217d are vacant.

Figure 7:
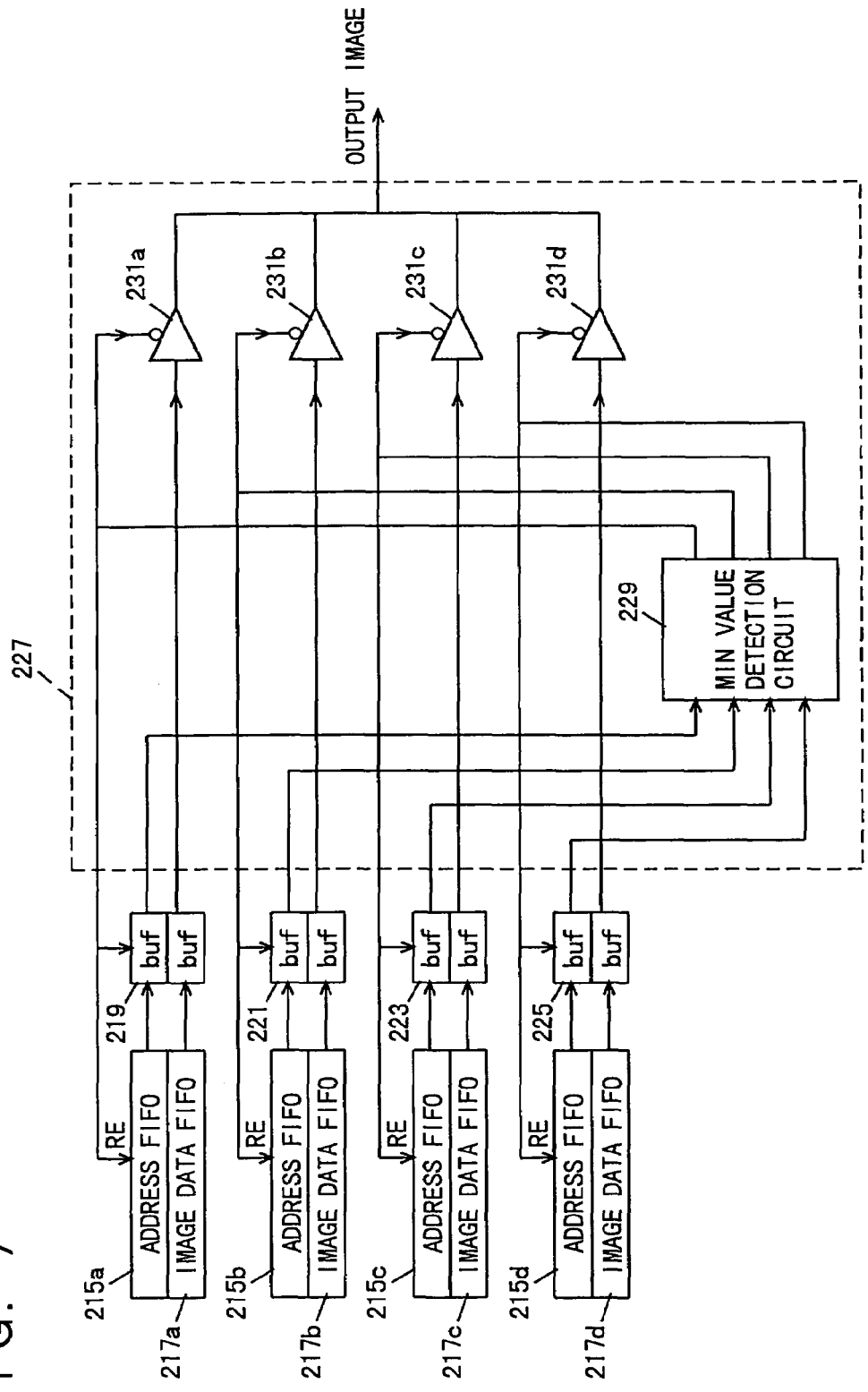
FIG. 7 is a block diagram showing the structure of a selector 227 in FIG. 6.

FIG. 7 is a block diagram showing the structure around the selector 227 in detail. Referring to FIG. 7, the selector 227 includes a MIN value detection circuit 229 and transfer gates 231a to 231d.

Figure 8:
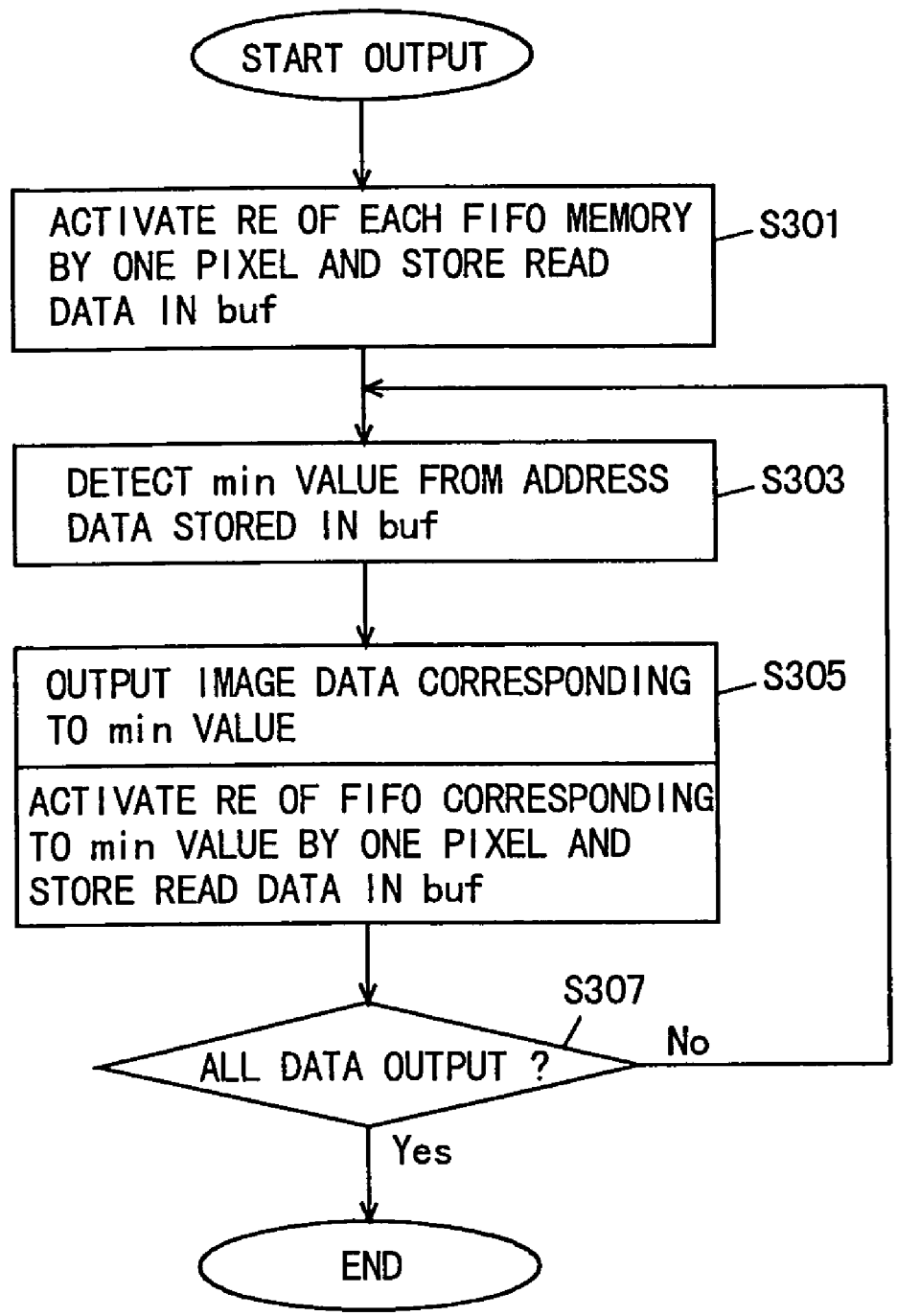
FIG. 8 is a flowchart showing operations of the selector 227.

FIG. 8 is a flowchart showing operations of the selector 227. Referring to FIG. 8, the selector 227 activates a read signal RE of each of the FIFO memories 215a to 215d and 217a to 217d for one pixel in response to an output start instruction from the data flow control part 205 at a step S301. The selector 227 stores read data in each of the buffer memories 219 to 225. The MIN value detection circuit 229 detects the minimum one from address data stored in the buffer memories 219 to 225 and outputs a common read signal to the FIFO memory, the buffer memory and the transfer gate corresponding to the minimum address data. Thus, image data corresponding to the minimum address data is selected as output data, and data from the FIFO memories 215a to 215d and 217a to 217d are newly stored in the buffer memories 219 to 225. This operation is performed in synchronization with an output clock. Thus, image data stored in the FIFO memories 215a to 215d and 217a to 217d at random are sequentially sorted by an output unit and output along the sequence of the addresses.

The image processor 201 according to this embodiment can be synchronized with an input unit (e.g., the scanner) and the output unit (e.g., the printer) through the FIFO memories 215a to 215d and 217a to 217d. Further, processing in the MPU1 to MPU4 can be performed independently of (asynchronously with) the input unit and the output unit. Thus, image processing can be performed regardless of data transfer clocks of the input and output units.

Third Embodiment

Figure 9:
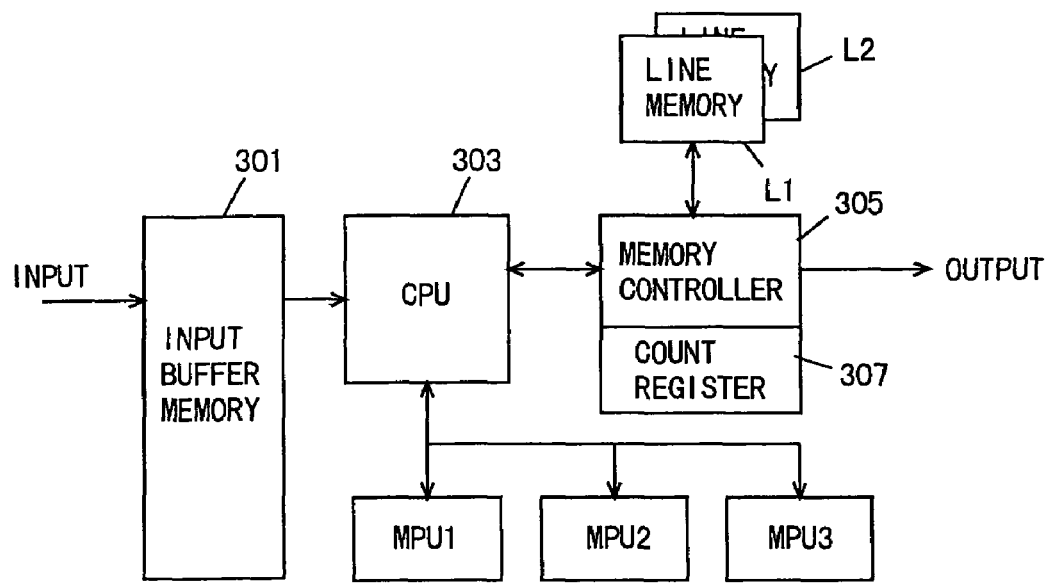
FIG. 9 is a block diagram showing the structure of an image processor of a third embodiment according to the present invention.

FIG. 9 is a block diagram showing the structure of an image processor of a third embodiment according to the present invention. Referring to FIG. 9, the image processor is formed by an input buffer memory 301 temporarily storing input image data, a CPU 303 controlling the overall device, MPU1 to MPU3 dividing input image data into a plurality of image data and processing the same in parallel with each other, line memories L1 and L2 storing output image data, a memory controller 305 controlling the line memories L1 and L2 and a count register 307 counting the quantities of image data written in the line memories L1 and L2. The memory controller 305 includes registers for storing addresses of the image data processed by the MPU1 to MPU3 respectively and the employed line memory L1 or L2.

Figure 10:
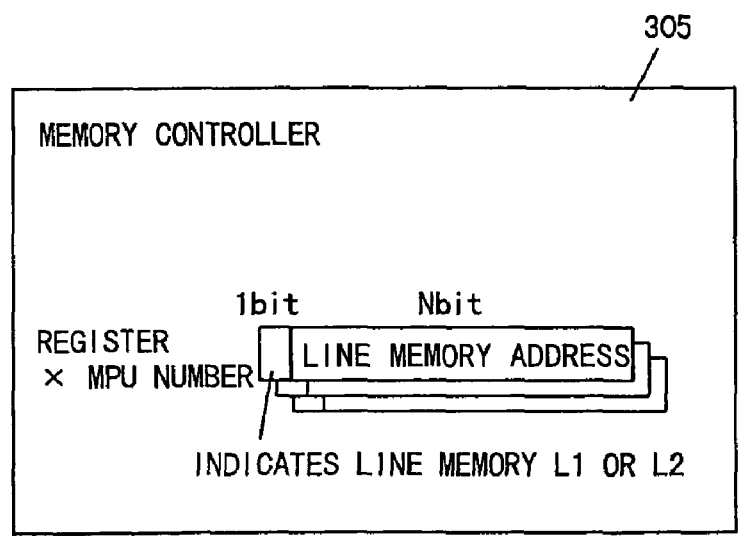
FIG. 10 illustrates the structure of a memory controller 305.

FIG. 10 illustrates the structure of the registers included in the memory controller 305. Referring to FIG. 10, each register is formed by (N +1) bits. The registers are provided in correspondence to the number (three in this embodiment) of the MPUs.

Figure 11:
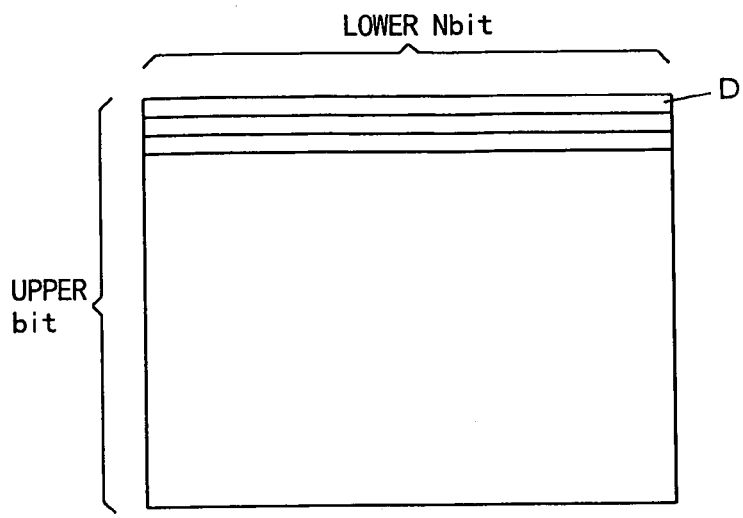
FIG. 11 illustrates a line memory address.

Each register records lower N bits of the image data processed by each MPU. As shown in FIG. 11, the lower N bits of the image data specify the position (line memory address) of a pixel in image data D for one line recorded in each line memory. As shown in FIG. 10, the registers record the line memory L1 or L2 storing the image data by 1-bit data together.

When one of the line memories L1 and L2 has a capacity of 4 kilobytes, for example, the address width thereof is 12 bits and hence each line memory is formed by a 13-bit register.

Figure 12:
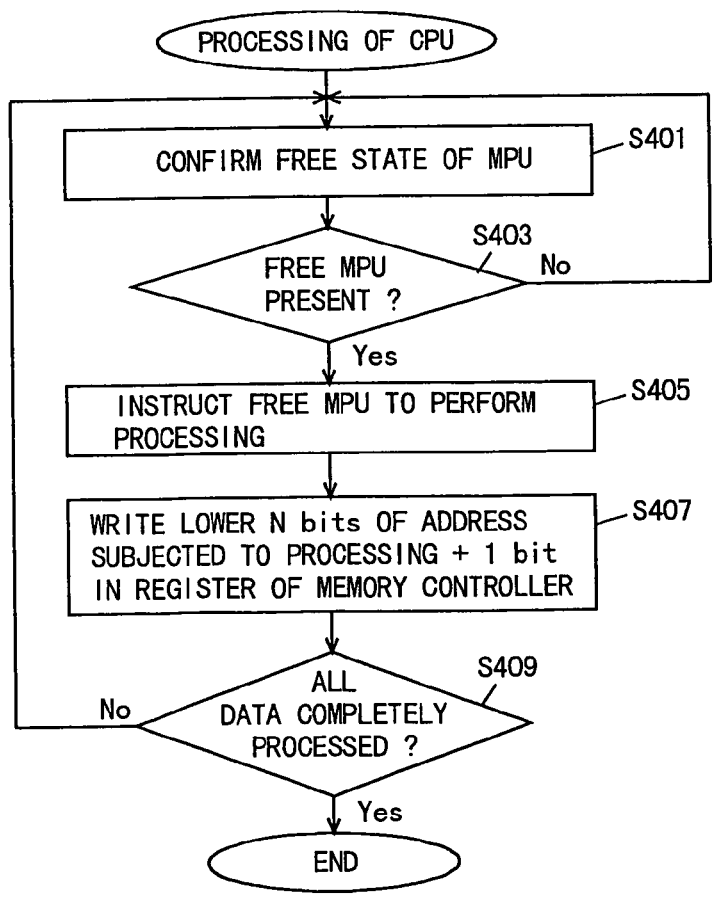
FIG. 12 is a flowchart showing processing of a CPU.

FIG. 12 is a flowchart showing processing of the CPU 303. Referring to FIG. 12, the CPU 303 confirms a status flag provided on each MPU thereby searching for an MPU performing no processing. The processing from the step S401 is repeated until a determination is made that there is an MPU performing no processing at the step S403.

If the determination at the step S403 is of YES, the CPU 303 outputs image data to the MPU performing no processing and instructs this MPU to process the image data at a step S405.

The CPU 303 writes the lower N bits of the address of the image data processed by the MPU and one of the line memories L1 and L2 for writing the image data in the register of the memory controller 305 at a step S407.

The CPU 303 determines whether or not all image data are completely processed at a step S409, to return to the step S401 if the determination is of NO or complete this routine if the determination is of YES.

Figure 13:
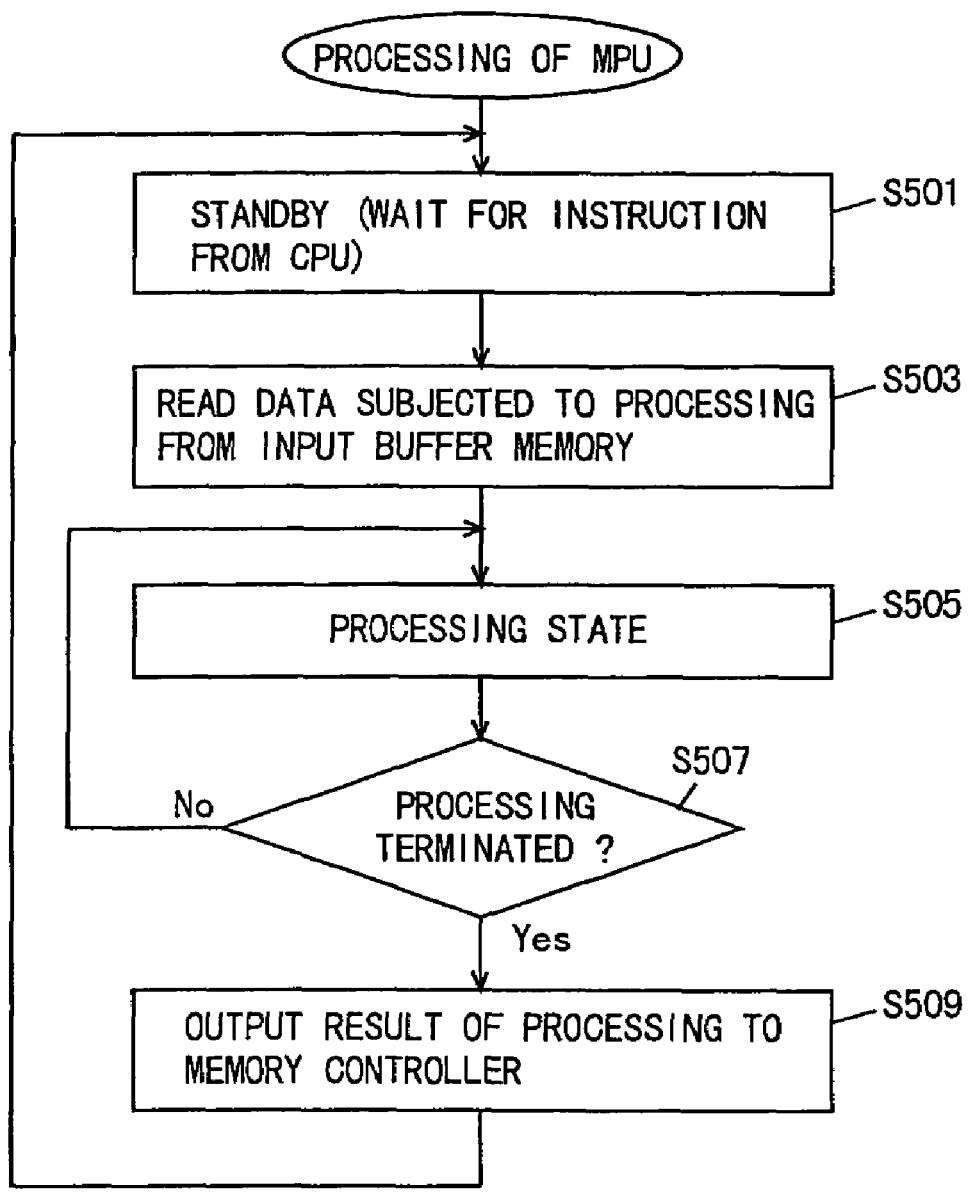
FIG. 13 is a flowchart showing processing of a single MPU.

FIG. 13 is a flowchart showing processing of each of the MPU1 to MPU3. Referring to FIG. 13, the MPU enters a standby state (state performing no processing) and waits for an instruction from the CPU 303 at a step S501. If an instruction is received from the CPU 303, the MPU reads data subjected to processing from the input buffer memory 301 at a step S503. The MPU performs image processing at a step S505, and determines whether or not the processing is terminated at a step S507. If the processing is terminated, the MPU outputs the result of the processing to the memory controller 305 at a step S509. Thereafter the MPU repeats the processing from the step S501.

Figure 14:
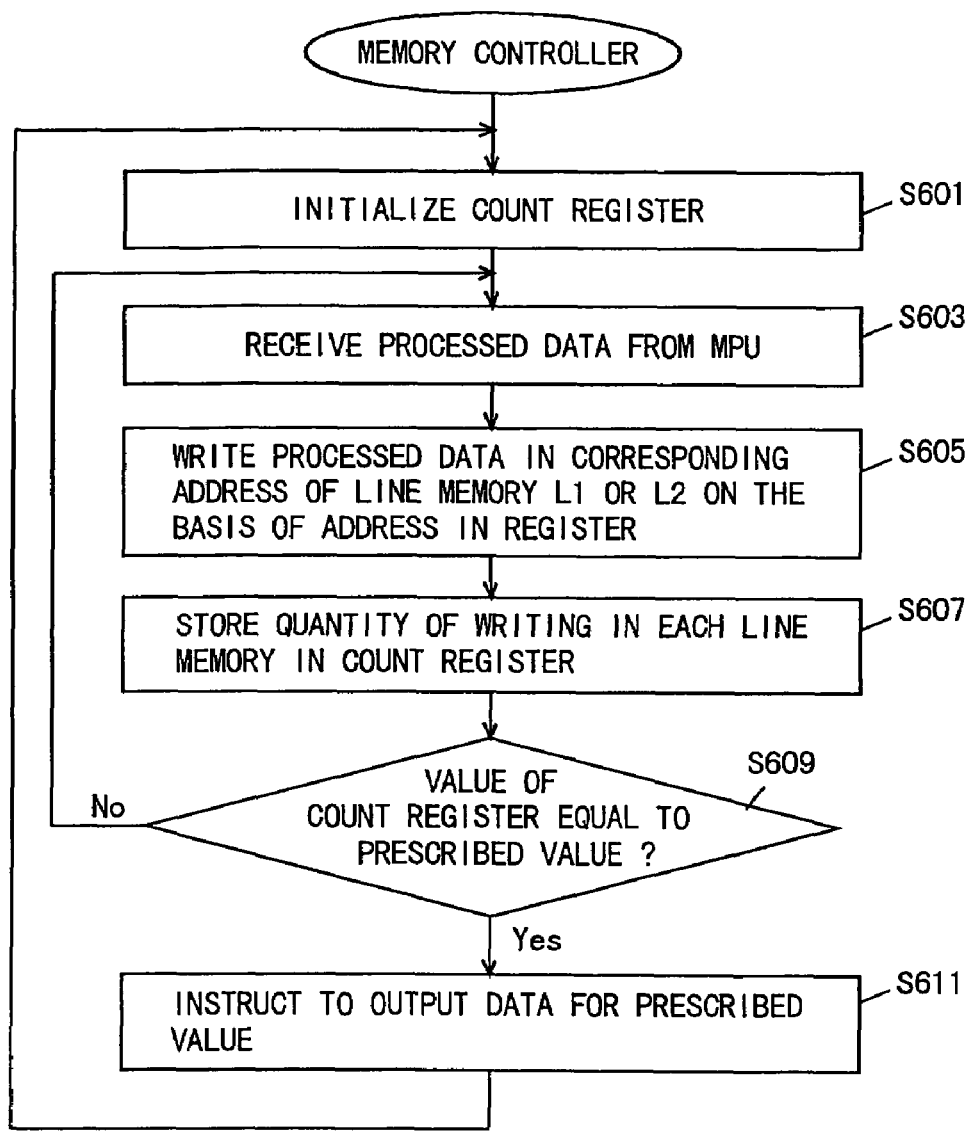
FIG. 14 is a flowchart showing processing of the memory controller 305.

FIG. 14 is a flowchart showing processing of the memory controller 305. Referring to FIG. 14, the memory controller 305 initializes the count register 307 at a step S601. At a step S603, the memory controller 305 receives processed data from any of the MPU1 to MPU3 through the CPU 303.

At a step S605, the memory controller 305 writes the processed data received from the MPU in the corresponding address of the line memory L1 or L2 on the basis of the line memory address stored in the register (see FIG. 10) of the memory controller 305.

At a step S607, the memory controller 305 stores the number of data written in the line memory in the count register 307. More specifically, the memory controller 305 increments the value of the count register 307 by one. At a step S609, the memory controller 305 determines whether or not the value of the count register 307 reaches a prescribed value (N bits), in order to determine whether or not the line memory is full. If the determination is of YES, the memory controller 305 instructs the line memory L1 or L2 to output data by the prescribed value (N bits). Thereafter the process returns to the step S601.

If the determination at the step S609 is of NO, the process returns to the step S603.

FIG. 15 illustrates the processing of the MPU1 to MPU3 and the write procedure of each line memory in the image processor according to this embodiment. Referring to FIG. 15, the input buffer memory 301 receives image data D0 to D4095 and address data 0 to 4095. The MPU1 to MPU3 sequentially process the data stored in the input buffer memory 301. Each MPU terminating the processing receives new data from the input buffer memory 301 and processes the same. The data, which are written in the line memory from the processed one, are not necessarily written along the sequence of addresses. However, the output data are written in positions indicated by address data, thereby allowing rearrangement.

The count register 307 performs counting every time data is written in the line memory. When the value of the count register 307 reaches a prescribed value (4095 in this embodiment) to indicate that the line memory is filled with data, the image data stored in the line memory are output.

Figure 16:
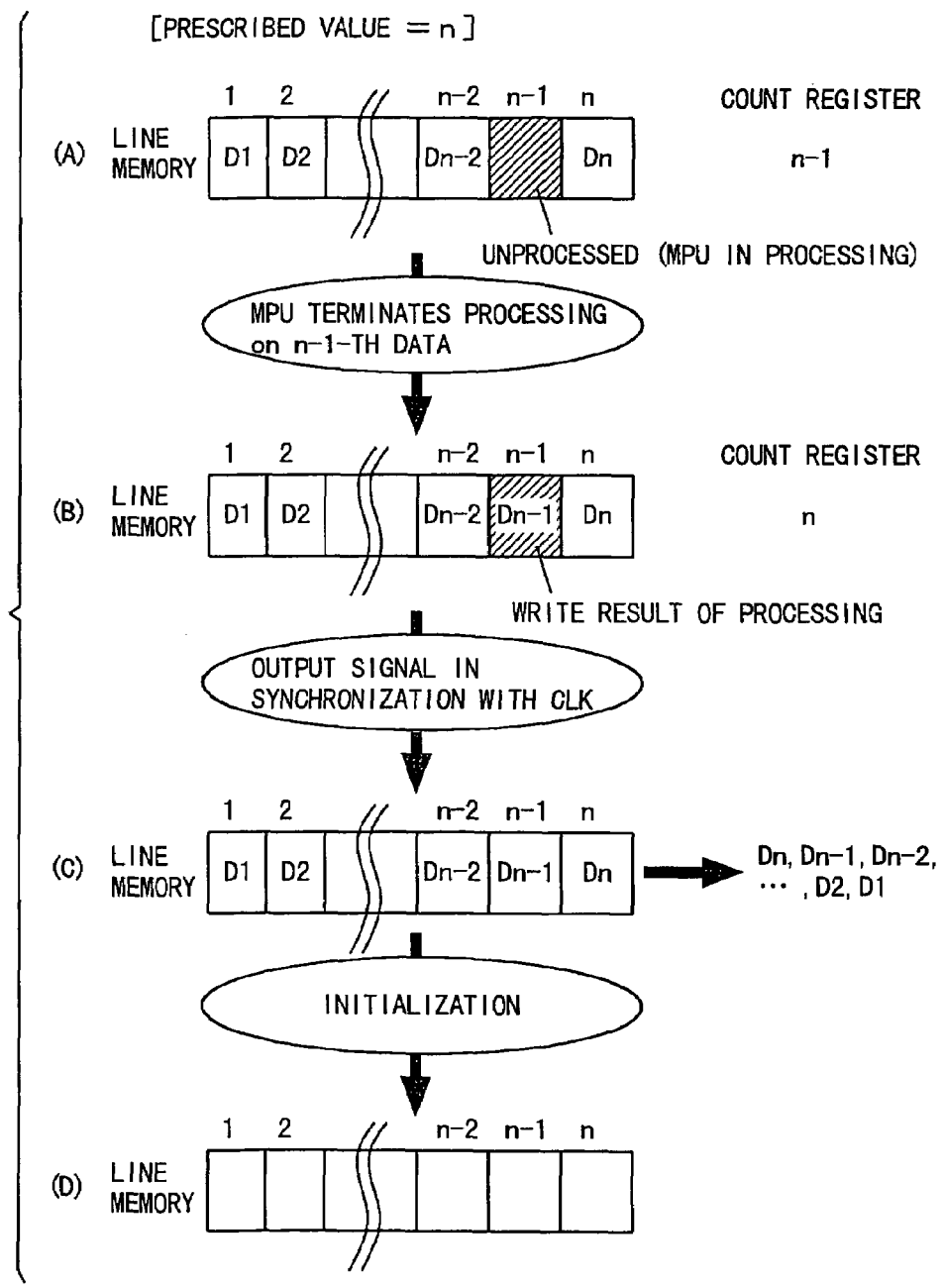
FIG. 16 illustrates write and output timings of a line memory.

FIG. 16 illustrates a write operation in the line memory. Referring to FIG. 16, it is assumed that the line memory records n image data 1 to n. In other words, the line memory is so controlled as to output recorded image data when the count register 307 counts the value n.

As shown at (A), it is assumed that image data of an address (n−1) of the line memory is unprocessed while the remaining image data are completely processed and written in the line memory. At this time, the value of the count register 307 is (n−1). If any MPU completely processes the image data of the address (n−1), this image data Dn−1 is written in the address (n−1) of the line memory as shown at (B). At this time, the value of the count register 307 is incremented by one to reach n. Then, the memory controller 305 outputs an output signal in synchronization with a clock signal CLK. Thus, data are sequentially output from the line memory along the sequence of D1 to Dn, as shown at (C). Thereafter the line memory is initialized to clear all data recorded therein, as shown at (D).

According to this embodiment, the processed data from the MPU1 to MPU3 are written in the line memory L1 or L2 and hence results asynchronously processed by the MPU1 to MPU3 can be efficiently output in association with a synchronous signal. Further, the image data can be output in line units without waiting for completion of processing of image data for one page stored in the input buffer memory 301, whereby high-speed processing is enabled.

In addition, the memory controller 305 controls the storage state of the line memory L1 or L2, and hence the burden of the CPU 303 can be reduced.

Fourth Embodiment

FIG. 17 is a block diagram showing the structure of an image processor of a fourth embodiment according to the present invention.

Referring to FIG. 17, the image processor is formed by an input buffer memory 401 storing input image data, MPU1 to MPU3 dividing the input image data into a plurality of image data and processing the same in parallel with each other, a data flow control part 409 controlling the MPU1 to MPU3, an output buffer memory 403 temporarily storing output image data, an address memory 405 storing addresses of the output image data, and a memory controller 407 reading the image data from the output buffer memory 403 on the basis of the address data stored in the address memory 405 and making control to output the image data along the sequence of the addresses.

FIG. 18 illustrates operations of the image processor according to this embodiment. The input buffer memory 401 stores image data a1 to f1 along the sequence of addresses 1 to 7. The MPU1 to MPU3 process the image data in parallel with each other, and hence the sequence of the image data stored in the output buffer memory 403 does not necessarily match with the sequence of the image data stored in the input buffer memory 403. Therefore, the image processor includes the address memory 405 storing the addresses of the image data stored in the output buffer memory 403, thereby simplifying rearrangement of the image data. In other words, the memory controller 407 reads the image data from the output buffer memory 403 along the sequence of the addresses stored in the address memory 405 and outputs the image data. Thus, rearranged image data are output.

Figure 19:
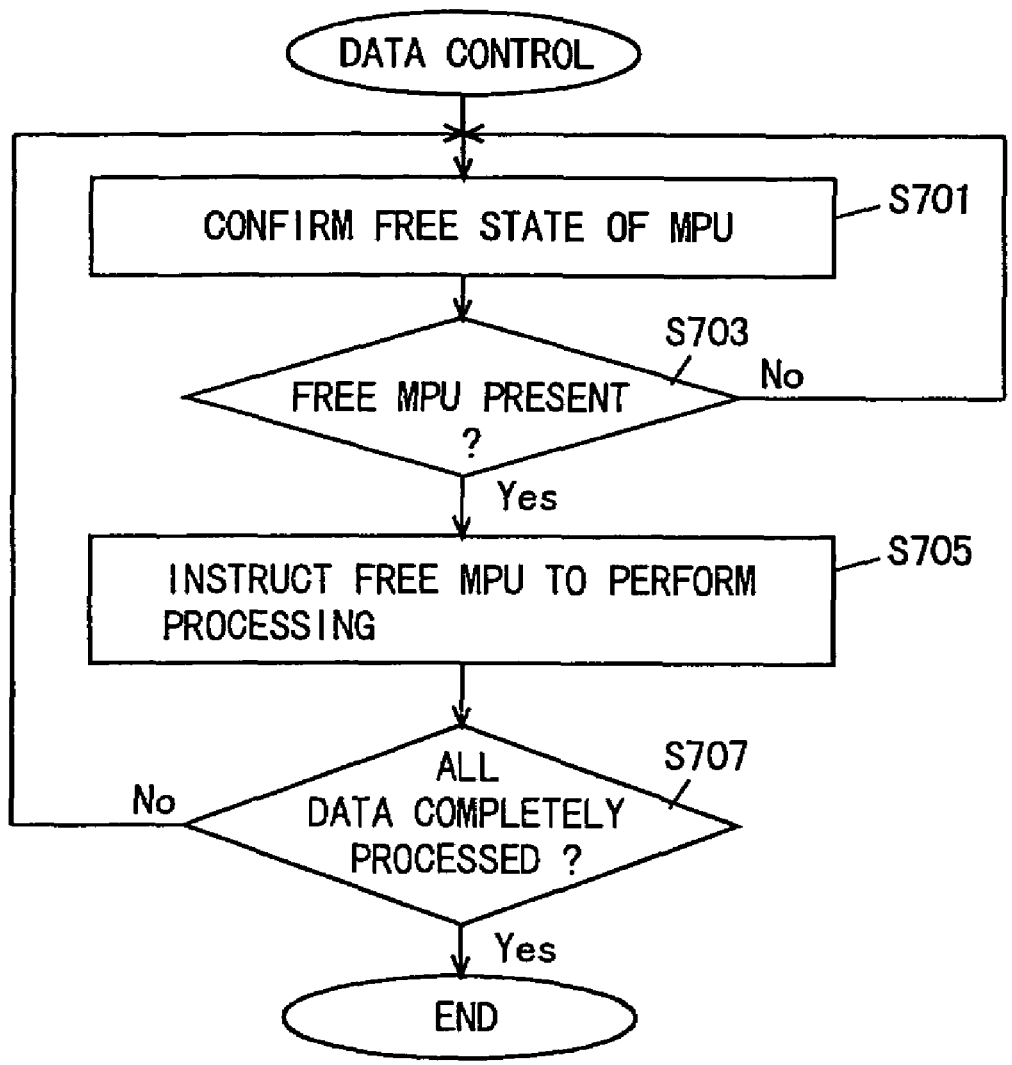
FIG. 19 is a flowchart showing processing of a data flow control part.

FIG. 19 is a flowchart showing processing of the data flow control part 409. Referring to FIG. 19, the data flow control part 409 confirms free states of the MPU1 to MPU3 at a step S701. When a determination is made that there is a free MPU at a step S703, the data flow control part 409 instructs the free MPU to perform processing at a step S705. Thereafter the data flow control part 409 determines whether or not all data are completely processed, and terminates the processing if the determination is of YES.

If the determination at the step S703 is of NO, the process returns to the step S701. If the determination at the step S707 is of NO, the process also returns to the step S701.

Figure 20:
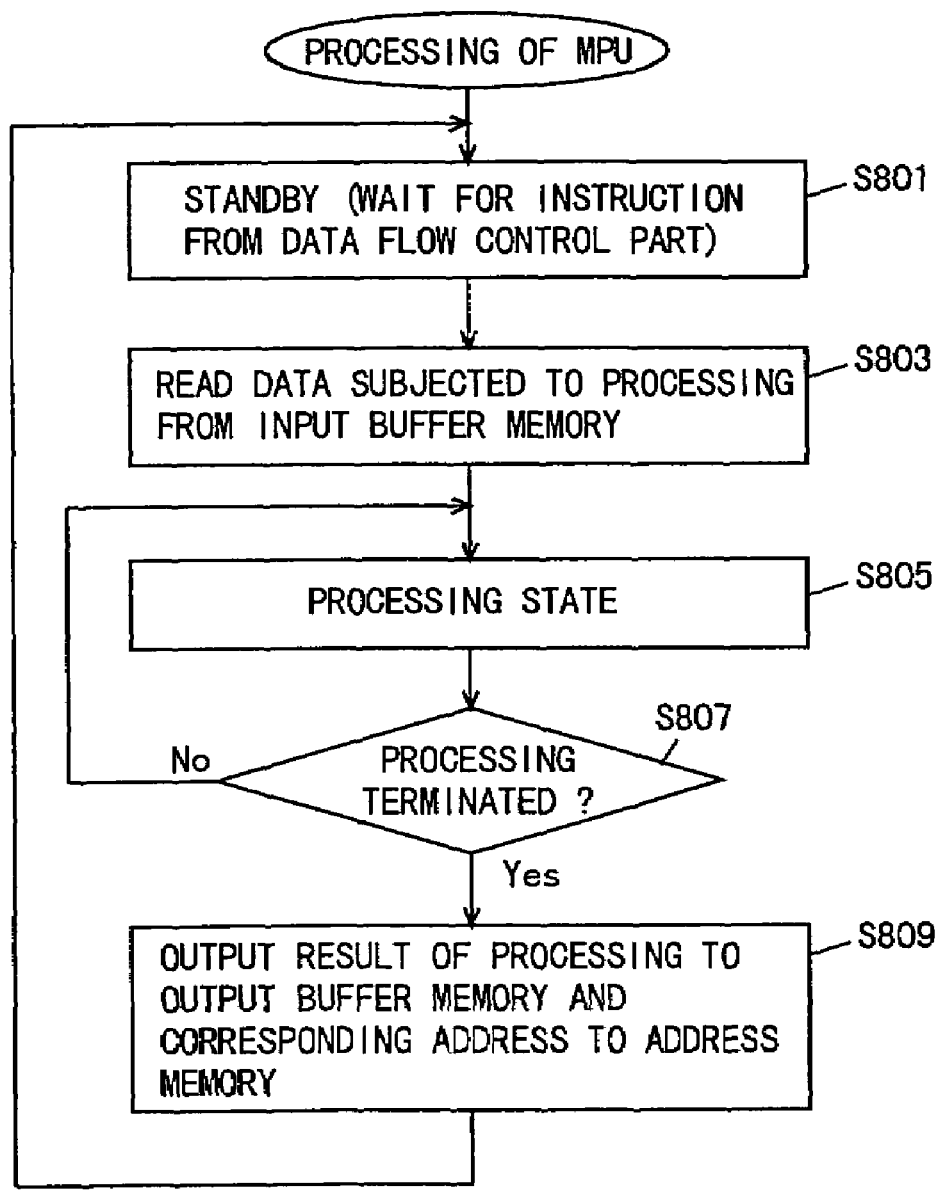
FIG. 20 is a flowchart showing processing of a single MPU.

FIG. 20 is a flowchart showing operations of each MPU. Referring to FIG. 20, the MPU enters a standby state at a step S801, to wait for an instruction from the data flow control part 409. When receiving an instruction from the data flow control part 409, the MPU reads image data subjected to processing from the input buffer memory 401 at a step S803. The MPU processes the image data at a step S805, and waits for termination of the processing at a step S807. If the processing is terminated, the MPU stores the processed image data in the output buffer memory 403 and writes the address of the image data in the corresponding position of the address memory 405 at a step S809. Thereafter the process returns to the step S801.

While the MPU1 to MPU3 sequentially write the data in the output buffer memory 403 and the address memory 405 from that terminating processing in this embodiment, writing may be performed on the basis of predetermined priority when a plurality of MPUs simultaneously terminate processing.

Figure 21:
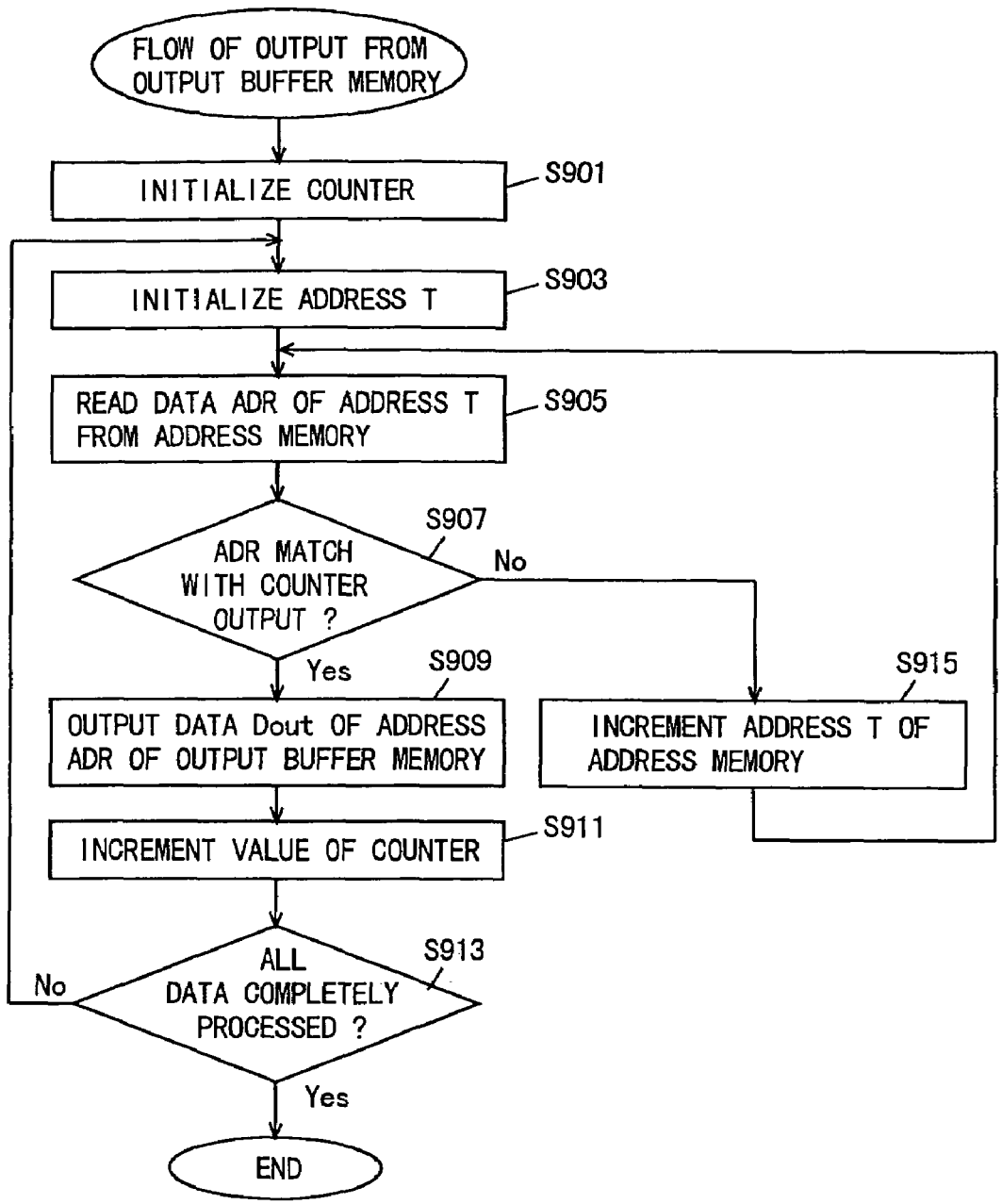
FIG. 21 is a flowchart showing operations of a memory controller.

FIG. 21 is a flowchart showing operations of the memory controller 407.

Referring to FIG. 21, "counter" indicates a counter counting a data output number. "Address T" indicates addresses of the address memory 405 and the output buffer memory 403. "Data ADR" indicates data stored in the address memory 405. "Data Dout" indicates data stored in the output buffer memory 403.

Referring to FIG. 21, the memory controller 407 initializes the counter at a step S901. This counter corresponds to the data stored in the output buffer memory 403, and counts up along the sequence of 0, 1, 2, . . . every time data is output.

At a step S903, the memory controller 407 initializes the address T. Then, the memory controller 407 reads the data ADR of the address T from the address memory 405.

The memory controller 407 determines whether or not the data ADR and the value of the counter match with each other at a step S907, and outputs the data Dout of the address ADR of the output buffer memory 403 at a step S909 if the determination is of YES. Then, the memory controller 407 increments the value of the counter by one at a step S911, and determines whether or not all image data are completely output at a step S913.

If the determination at the step S913 is of YES, this routine is terminated. If the determination at the step S913 is of NO, the process returns to the step S903.

If the determination at the step S907 is of NO, the memory controller 407 increments the address T of the address memory 405 by one at a step S915, and the process returns to the step S905.

Figure 22:
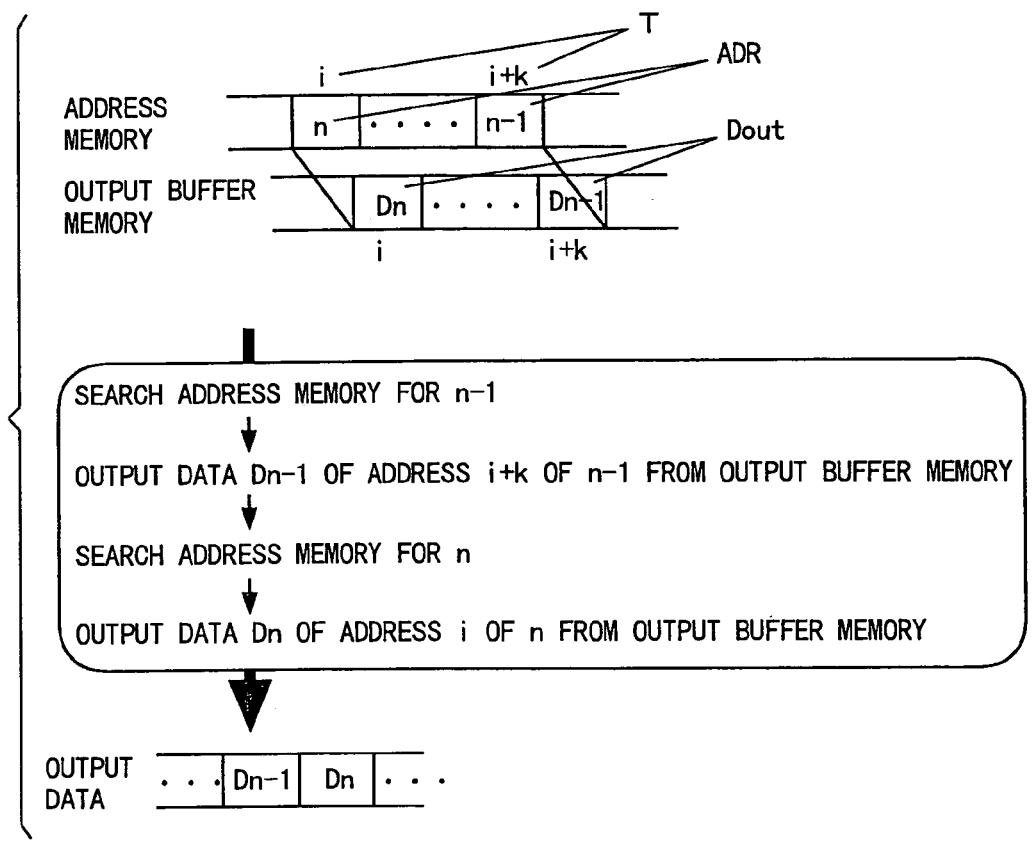
FIG. 22 illustrates effects of the fourth embodiment.
Figure 25:
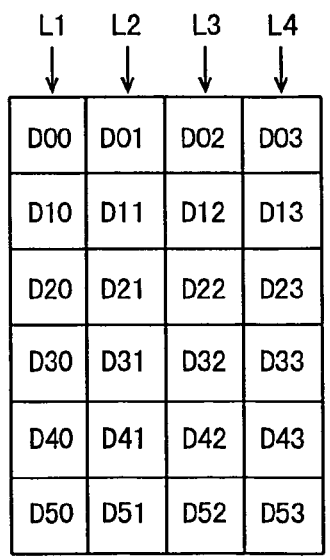
FIG. 25 illustrates specific examples of image data processed by the image processor.

FIG. 22 illustrates effects of the image processor according to this embodiment.

Referring to FIG. 22, the addresses T of the address memory 405 and the output buffer memory 403 correspond to each other. The address memory 405 sequentially stores addresses (addresses of input data) n−1, n, . . . of image data subjected to processing. The output buffer memory 403 stores output data Dn−1, Dn, . . . obtained as the result of image processing.

After all data are processed, the address memory 405 is sequentially searched for addresses of the data to be output. For example, the address memory 405 is searched for the data (n−1). The address for the data (n−1) in the address memory 405 is (i+k), and hence the output buffer memory 403 outputs data of the address (i+k).

Then, the address memory 405 is searched for data n, in order to output n-th data. The address of the address memory 405 for the data n is i, and hence the output buffer memory 403 outputs data of the address i.

Output results stored at random from the head can be sequentially output by performing the aforementioned operations until all data N are output.

As hereinabove described, the image processor according to this embodiment can efficiently sequentially output data asynchronously processed and stored at random.

While images in page units must be divided into block units in general image processing, each MPU in each of the first to fourth embodiments of the present invention performs processing in block units (it is assumed that one pixel forms one block in the second to fourth embodiments) of the image data. In the first to fourth embodiments of the present invention, therefore, effective processing suitable for image processing is enabled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processor comprising:
a plurality of processors processing respective portions of the same input image data in parallel with each other and outputting respective processed portions of said input image data;
an address memory accepting and storing address information related to a position of each portion of said input image data within said input image data for each respective portion of image data which has been processed by said plurality of processors;
input means inputting image data subjected to processing in synchronization with a first external device, and
output means outputting said image data processed in said plurality of processors and said address information stored in said address memory in synchronization with a second external device.

2. The image processor in accordance with claim 1, further comprising:
an image memory storing said image data output from said plurality of processors, and
read means reading said image data from said image memory on the basis of said address information stored in said address memory.

3. The image processor in accordance with claim 1, further comprising an image memory storing said image data output from said plurality of processors along the sequence of addresses on the basis of said address information stored in said address memory.

4. The image processor in accordance with claim 1, wherein said plurality of processors also output arrangement information corresponding to said processed portions of said image data.

5. An image processor comprising:
a plurality of processors performing prescribed processing on a plurality of data divided from single image data respectively;
a first memory accepting and storing arrangement information in said single image data for said plurality of divided data, said arrangement information for each of said plurality of divided data being associated with whichever processor performs the prescribed processing of the divided data; and
a controller restoring a single image from said plurality of data processed in said plurality of processors in accordance with said arrangement information.

6. The image processor in accordance with claim 5, further including a second memory storing said data processed in said plurality of processors, wherein said controller reads said data from said second memory in sequence along said arrangement information and restores said image.

7. The image processor in accordance with claim 5, further including an image memory, wherein said controller stores processed data in positions of said image memory corresponding to said arrangement information.

8. The image processor in accordance with claim 5, wherein said first memory is provided in correspondence to each of said plurality of processors.

9. The image processor in accordance with claim 5, wherein said plurality of processors also output arrangement information corresponding to processed said data when outputting said data.

10. An image processing method including steps of:
dividing input image data into a plurality of image data;
storing information indicating arrangement of said divided image data relative to said input image;
performing image processing on said divided image data with a plurality of processors;
outputting said processed data as well as said information indicating arrangement of said divided data; and
restoring a single image from said processed data in accordance with said information indicating arrangement of said divided data,
wherein each of said plurality of processors processes plural portions of said divided image data, and information indicating arrangement of each divided portion of said image data is associated with whichever processor processes the corresponding divided portion.

11. An image processor comprising:
first and second processors having:
an input image data port and an input image address port, for inputting, respectively, image data corresponding to a portion of an image and a position of the image data within the image; and
an output image data port and an output image address port for outputting, respectively, processed image data corresponding to a portion of a processed image and a position of said processed image data within the processed image; and
a data flow control, coupled to said first and second processors, for coordinating the operation thereof so that each of said first and second processors process plural portions of said input image and said first and second processors processes said plural portions asynchronously with respect to each other.

12. The image processor of claim 11, further comprising:
an output image data memory; and
an output image address memory, the output image address memory for storing a position of the image data in the output image data memory relative to the image.

13. An image processor comprising:
a plurality of processors processing respective portions of the same input image data in parallel with each other and outputting respective processed portions of said input image data; and
an address memory accepting and storing address information related to a position of each portion of said input image data within said input image data for each respective portion of image data which has been processed by said plurality of processors;
an image memory storing said image data output from said plurality of processors, and
a reader reading said image data from said image memory on the basis of said address information stored in said address memory.

14. An image processor comprising:
a plurality of processors processing respective portions of the same input image data in parallel with each other and outputting respective processed portions of said input image data; and
an address memory accepting and storing address information related to a position of each portion of said input image data within said input image data for each respective portion of image data which has been processed by said plurality of processors;

an input unit inputting image data subjected to processing in synchronization with a first external device, and an output unit outputting said image data processed in said plurality of processors and said address information stored in said address memory in synchronization with a second external device.

15. An image processor comprising:

a plurality of processors processing respective portions of the same input image data in parallel with each other and outputting respective processed portions of said input image data; and an address memory accepting and storing address information related to a position of each portion of said input image data within said input image data for each respective portion of image data which has been processed by said plurality of processors;

wherein said address information is stored so that said address information is associated with whichever processor of the plurality of processors processed the portion of said input image data related to the address information.

* * * * *